(12) United States Patent
Bird

(10) Patent No.: US 7,066,721 B2
(45) Date of Patent: Jun. 27, 2006

(54) CEILING FAN MOTORS

(75) Inventor: Gregory Michael Bird, Colliersville, TN (US)

(73) Assignee: Hunter Fan Company, Memphis, TN (US)

( * ) Notice: Subject to any disclaimer, the term of this patent is extended or adjusted under 35 U.S.C. 154(b) by 377 days.

(21) Appl. No.: 10/458,842

(22) Filed: Jun. 11, 2003

(65) Prior Publication Data

US 2004/0253112 A1    Dec. 16, 2004

(51) Int. Cl.
F04B 17/00    (2006.01)
F04B 35/04    (2006.01)

(52) U.S. Cl. .............. 417/423.8; 417/423.1; 417/424.1

(58) Field of Classification Search .......... 417/423.1, 417/423.6, 423.7, 423.8, 423.14, 424.1; 416/5, 210 R, 204 R, 205, 206, 214 R; 310/62, 310/67 R, 89, 58, 52, 60 R
See application file for complete search history.

(56) References Cited

U.S. PATENT DOCUMENTS

| | | | |
|---|---|---|---|
| 2,488,365 A | 11/1949 | Abbott et al. | 172/36 |
| 2,494,471 A | 1/1950 | Claytor | 171/252 |
| 2,508,144 A | 5/1950 | Carville | 171/252 |
| 2,516,184 A | 7/1950 | Christie | 175/298 |
| 3,017,526 A | 1/1962 | Luenberger | 310/60 |
| 3,274,410 A | 9/1966 | Boivie | 310/62 |
| 3,281,615 A | 10/1966 | Cohen et al. | 310/93 |
| 3,610,976 A | 10/1971 | Wightman | 310/60 |
| 3,900,234 A | 8/1975 | Roddy et al. | 308/15 |
| 4,057,370 A | 11/1977 | Numata et al. | 417/366 |
| 4,065,233 A | 12/1977 | Torigoe et al. | 417/368 |
| 4,073,598 A | 2/1978 | Mizutani et al. | 416/5 |
| 4,186,317 A | 1/1980 | Sisk | 310/60 |
| 4,186,319 A | 1/1980 | Dochterman | 310/89 |
| 4,210,835 A | 7/1980 | Neveux | 310/62 |
| 4,250,417 A | 2/1981 | Arnold | 310/62 |
| 4,391,570 A | 7/1983 | Stutzman | 417/353 |
| 4,465,948 A | 8/1984 | Oyama et al. | 310/62 |
| 4,471,250 A | 9/1984 | Snider | 310/67 |
| 4,508,958 A | 4/1985 | Kan et al. | 219/369 |
| 4,536,672 A | 8/1985 | Kanayama et al. | 310/268 |
| 4,669,952 A | 6/1987 | Forsyth, III et al. | 415/119 |
| 4,689,507 A | 8/1987 | Baker et al. | 310/62 |
| 4,692,096 A | 9/1987 | Yang | 416/170 |
| 4,720,648 A | 1/1988 | DeVries et al. | 310/89 |

(Continued)

FOREIGN PATENT DOCUMENTS

GB    1 275 334    5/1972

(Continued)

OTHER PUBLICATIONS

Patent Abstracts of Japan, Publication No. 61108890, date-May 27, 1986, Application No. 59229450, date-Oct. 31, 1984, Applicant: Matshushita Seiko Co., Ltd., Inventor: Nakamura Yasuhiko; Title: Ceiling Fan.

(Continued)

Primary Examiner—William Rodriguez
(74) Attorney, Agent, or Firm—Baker Donelson

(57) ABSTRACT

An inside-out ceiling fan motor has a stator mounted to a downrod with an annular array of stator coils positioned about a rotor axis of rotation. A rotor is rotatably mounted about the stator. The rotor has a plurality of vanes spaced along the rotor periphery and canted at an angle of attack to a plane of rotor vanes rotation oriented normally to the rotor axis of rotation to scoop ambient air into the rotor during fan operation through the stator coils to cool them.

4 Claims, 5 Drawing Sheets

U.S. PATENT DOCUMENTS

| | | | | |
|---|---|---|---|---|
| 4,742,257 | A | 5/1988 | Carpenter | 310/62 |
| 4,862,581 | A | 9/1989 | Royer | 29/596 |
| 4,883,408 | A | 11/1989 | Borcherding | 416/93 |
| 4,904,891 | A | 2/1990 | Baker et al. | 310/62 |
| 4,908,538 | A | 3/1990 | Geberth, Jr. | 310/59 |
| 4,961,016 | A | 10/1990 | Peng et al. | 310/62 |
| 5,021,696 | A | 6/1991 | Nelson | 310/62 |
| 5,069,601 | A | 12/1991 | Shawcross | 417/360 |
| 5,194,770 | A | 3/1993 | Yoshioka et al. | 310/51 |
| 5,222,864 | A | 6/1993 | Pearce | 416/5 |
| 5,296,769 | A | 3/1994 | Havens et al. | 310/90 |
| 5,311,089 | A | 5/1994 | Stroetgen et al. | 310/50 |
| 5,441,387 | A * | 8/1995 | Yu | 416/5 |
| 5,462,412 | A | 10/1995 | Scofield et al. | 416/210 |
| 5,489,191 | A | 2/1996 | Tai | 416/5 |
| 5,883,449 | A | 3/1999 | Mehta et al. | 310/60 |
| 6,379,116 | B1 * | 4/2002 | Tai | 416/93 R |
| 6,438,322 | B1 * | 8/2002 | Reiker | 392/364 |
| 6,744,157 | B1 * | 6/2004 | Choi et al. | 310/62 |
| 6,751,406 | B1 * | 6/2004 | Reiker | 392/364 |
| 6,798,098 | B1 * | 9/2004 | Tai | 310/67 R |
| 6,857,854 | B1 * | 2/2005 | Pearce | 416/207 |
| 6,863,499 | B1 * | 3/2005 | Pearce | 416/210 R |
| 2003/0218396 | A1 * | 11/2003 | Hsieh | 310/89 |

FOREIGN PATENT DOCUMENTS

| | | |
|---|---|---|
| GB | 2 073 958 | 10/1981 |

OTHER PUBLICATIONS

Patent Abstracts of Japan, Publication No. 63129192, date-May 1, 1988, Application No. 61276055, date-Nov. 19, 1986, Applicant: Matshushita Seiko Co., Ltd., Inventor: Hasegawa Yukihisa; Title: Ceiling Fan.

Patent Abstracts of Japan, Publication No. 02040098, date-Feb. 8, 1990, Application No. 63191784, date-Jul. 29, 1988, Applicant: Matshushita Seiko Co., Ltd., Inventor: Matsumura Keiichi; Title: Ceiling Fan.

* cited by examiner

CEILING FAN MOTORS

TECHNICAL FIELD

This invention relates generally to ceiling fan motors and particularly to their self cooling features.

BACKGROUND OF THE INVENTION

Most ceiling fans are electrically powered. Typically they comprise an electric motor that is suspended beneath a ceiling by a hollow downrod through which electrical wires extend from building line power to the motor stator windings. An annular array of fan blades is mounted about the motor rotor by means of blade irons. As the rotor is rotatably mounted about the stator, rather than inside of it as conventional for electric motors, this type of motor is commonly referred to as an inside-out motor.

A problem common to such inside-out dynamoelectric motors is that of internal heating. High motor temperature operations adversely affect both motor operational efficiency and motor reliability and longevity. This problem is inherently more difficult to solve with inside-out electric motors since the stator and its windings, which become heated when energized, are both stationary and located inside surrounding structure, namely the rotor.

As shown in U.S. Pat. No. 5,883,449, this problem has heretofore been addressed by providing the rotor with an annular array of peripheral fins located about an internal impeller. The impeller serves to create low pressure on one side of the stator which, in combination with the peripheral fins, draws air from outside the motor casing across the stator windings and out of exhaust vents. Though this has provided stator cooling, the cooling has been limited by the internal location of the impeller. Also the fins inherently provide a structural mass that, though such does impel air, does so at the cost of restrictions in air flow and diminished returns in stator cooling. In part such is attributable to the fact that the fields of fins have been provided over both sides of the stator coils and have produced air turbulency. The addition of the impeller and fins also increased the cost of the motor.

Accordingly, it is seen that were an inside-out ceiling fan motor to be devised with simpler and more effective stator cooling means, both cooling and cost efficiency could be achieved. It thus is to the provision of such a ceiling fan motor that the present invention is primarily directed.

SUMMARY OF THE INVENTION

In a preferred form of the invention, an inside-out ceiling fan motor has a stator mounted to a downrod with an annular array of stator coils positioned about a rotor axis of rotation. A rotor is rotatably mounted about the stator and rotor axis. The rotor has vanes spaced along its periphery that are canted at an angle of attack to a plane oriented normally to the axis of rotation to scoop ambient air into the rotor during fan operation and through the stator coils to cool them.

In another preferred form of the invention an inside-out ceiling fan motor comprises a stator having an annular array of stator coils about a rotor axis of rotation. A rotor is rotatably mounted about the stator and the axis of rotation which has a stack of laminated rings mounted to a rotor casing radially about the stator coils by a rotor casing that has an upper portion mounted to and above the stack and a lower portion mounted to and below the stack. One of the rotor casing portions, preferably the lower one, is formed with air inlets that are at least partially bounded by casing vanes that have an inside surface proximal to the stator coils and an outside surface distal to the stator coils. The inside surfaces of these vanes are oriented at an angle of attack to scoop air into the rotor during rotor rotation and through the stator coils to cool them. The outside surfaces of these vanes is longer than the inside from leading edge to trailing edge to accelerate air flow over them.

DETAILED DESCRIPTION

Figure 1:
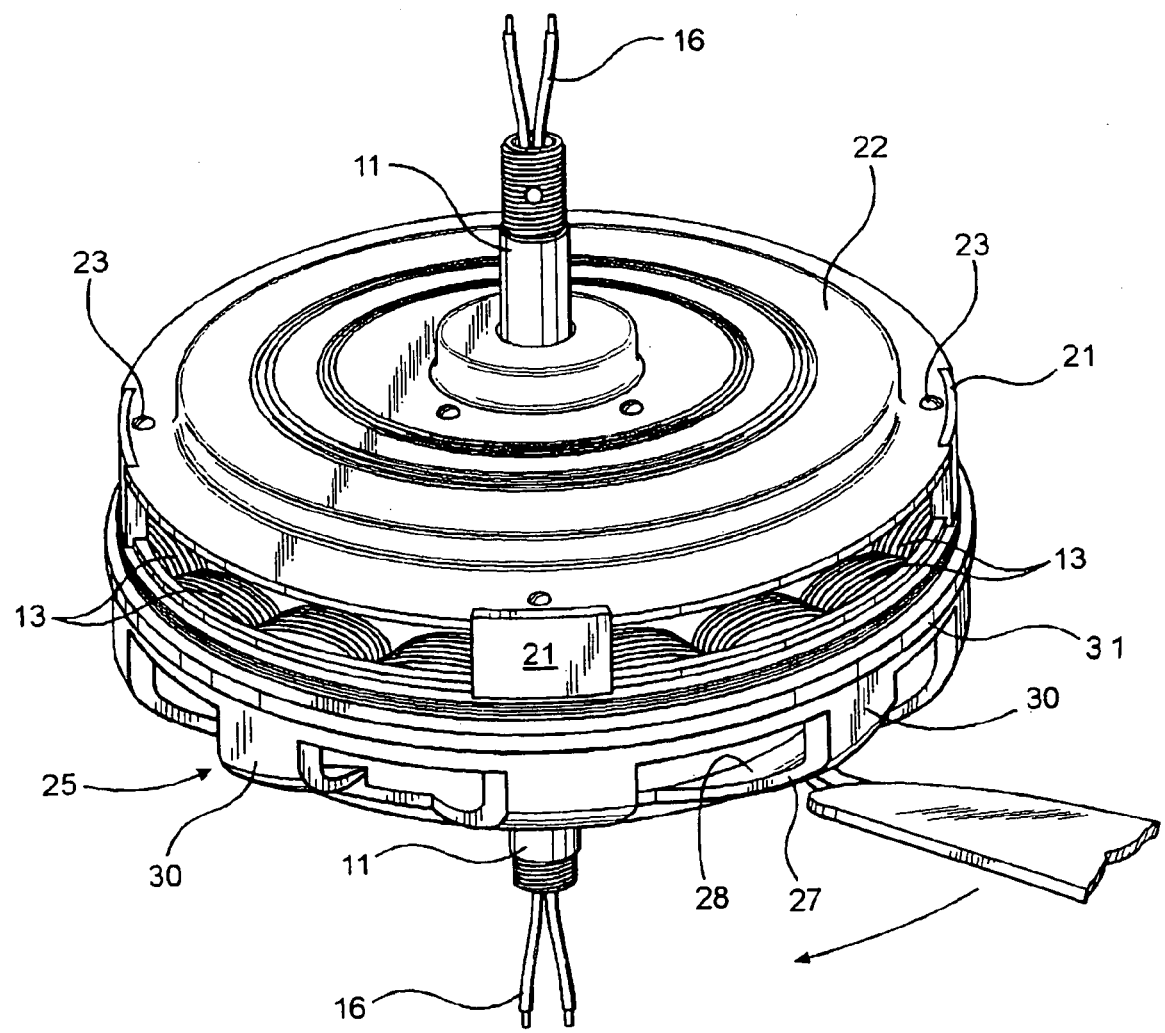
FIG. 1 is a perspective view of a ceiling fan motor that embodies the invention in its preferred form.
Figure 2:
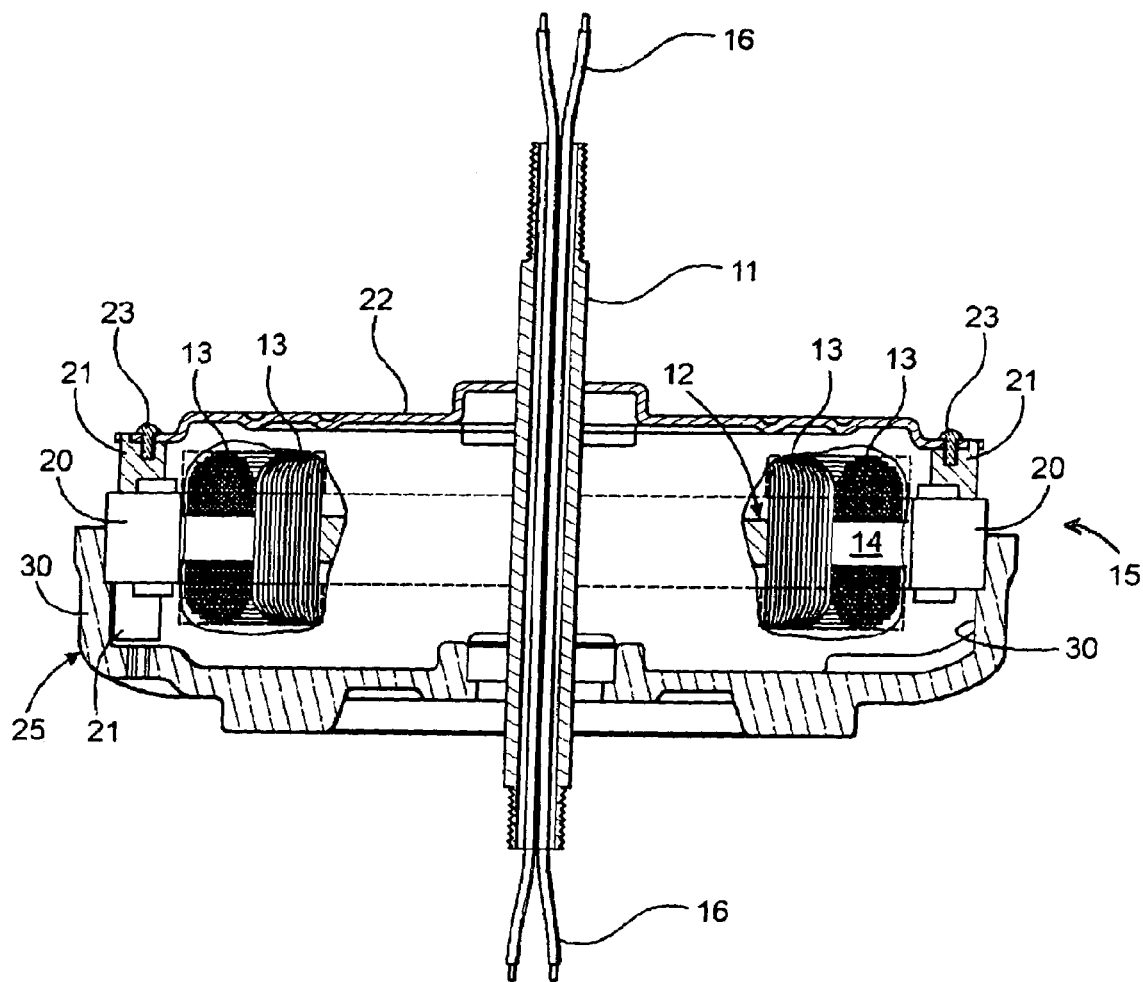
FIG. 2 is a side view, in cross section, of the motor shown in FIG. 1.

Referring now in more detail to the drawing, there is shown a ceiling fan suspended from a ceiling 10 by a hollow downrod 11. The motor is an inside-out type that has its stator 12 mounted inside the rotor 15 directly to the downrod. The stator is of conventional construction having an annular array of stator windings or coils 13 mounted on a multi-slotted stack of electrical steel laminations, 14. Electrical wires 16 extend from a source of municipal power down from the ceiling through the downrod to the stator windings. They also extend below the motor to an unshown fan light kit.

Figure 3:
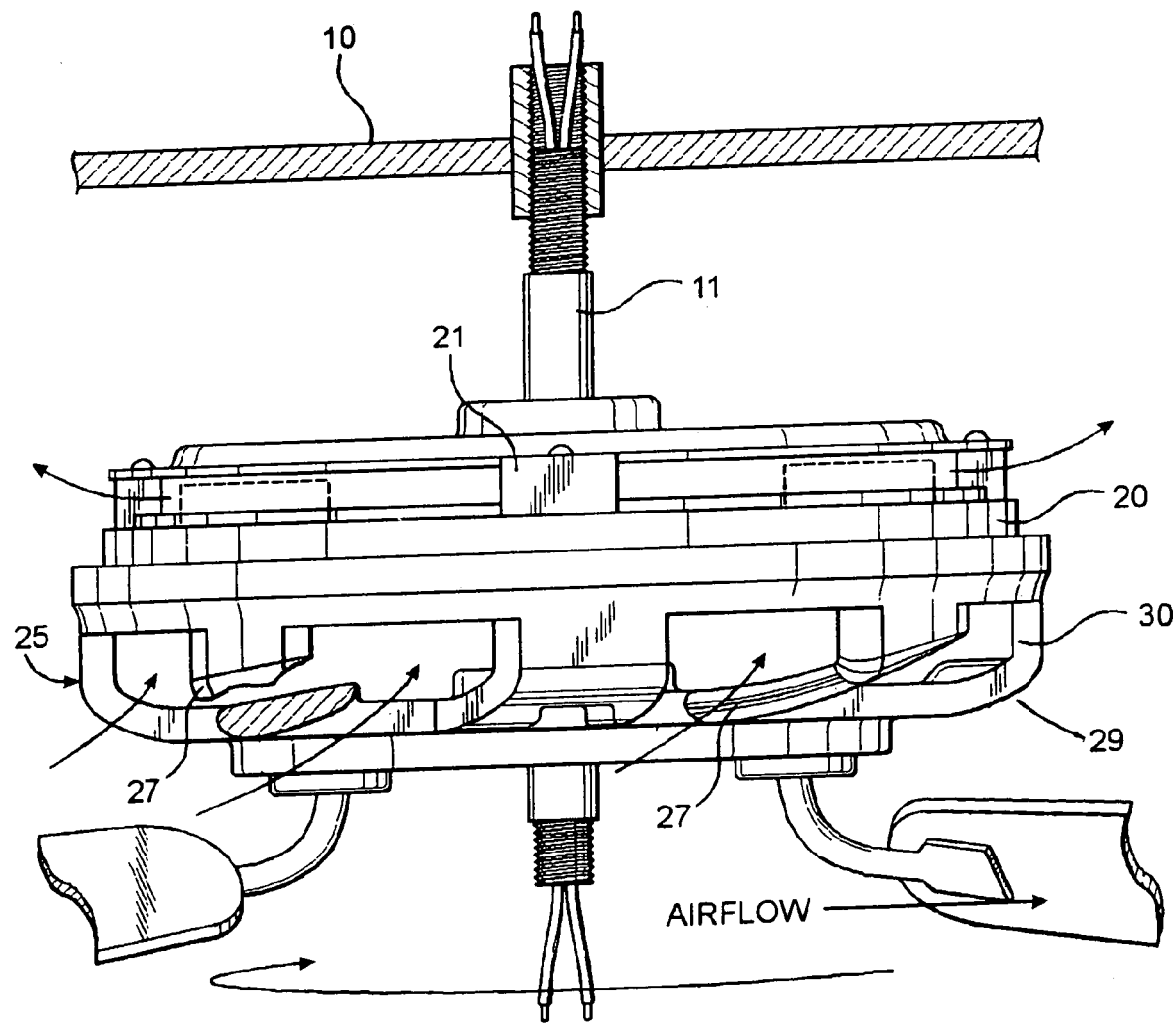
FIG. 3 is a side elevational view of the motor shown in FIG. 1.
Figure 4:
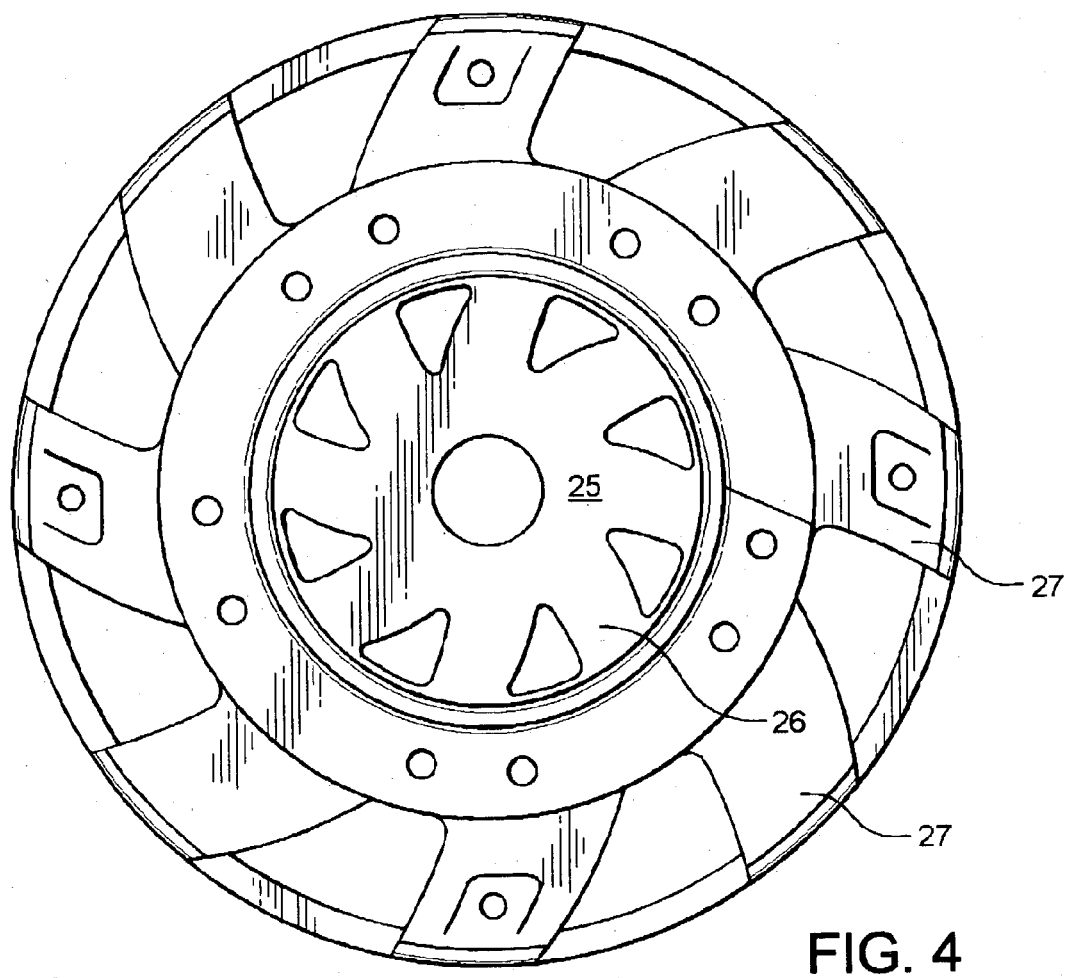
FIG. 4 is a bottom view of the motor, FIG. 4A being an enlarged fragmentary view thereof.
Figure 4A:
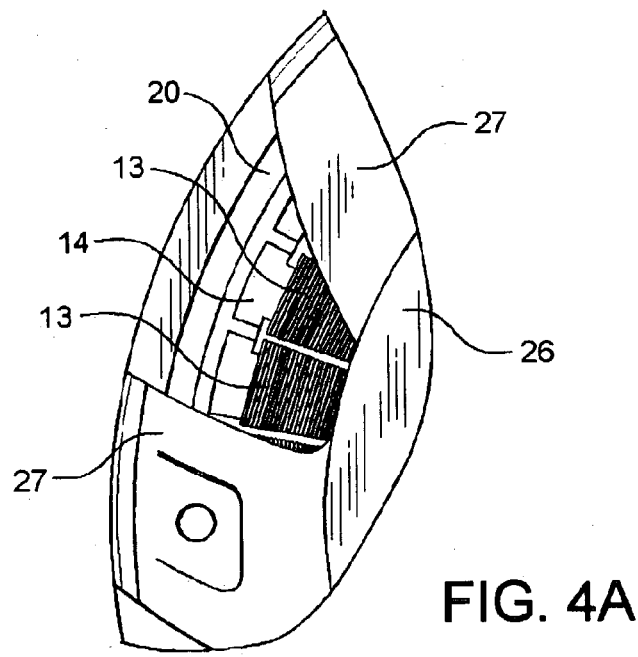

The rotor 15 here is of unique construction. It too conventionally has a stack of electrical steel laminations 20 that are mounted for rotation about those of the stator with a small annular air gap therebetween. Four posts 21 extend above and below the stack 20. A rotor upper casing or top plate 22 is mounted securely atop these posts by screws 23 spaced above the stator windings to provide a substantially unobstructed annular outlet to ambience for air outflow as indicated by arrows in FIG. 3.

Figure 5:
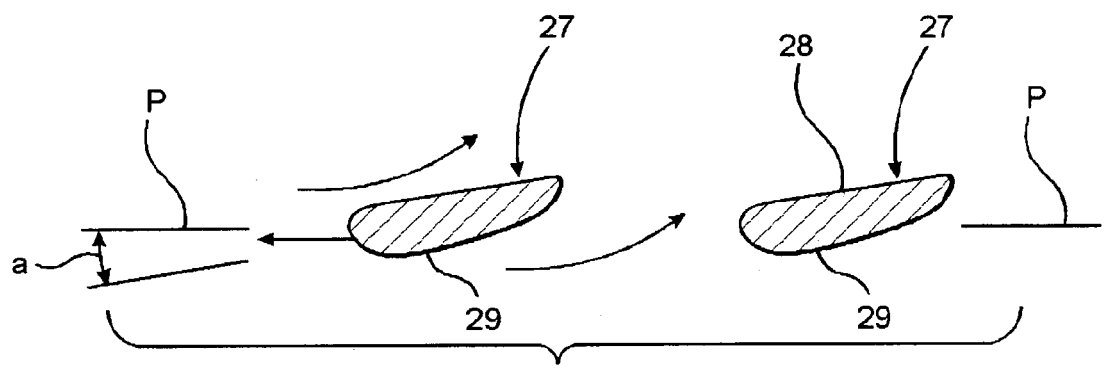
FIG. 5 diagrammatically illustrates two adjacent rotor vanes in section.

A lower rotor casing 25 is mounted to the other, bottom ends of the posts 21. It is a unitary cast iron part that has a bottom disk 26 from which eight legs or vanes 27 extend upwardly to a peripheral ring 31 that cradles the stack of laminations 20. These vanes are spaced apart to provide air intakes into the rotor as also indicated by arrows in FIG. 3. Each vane has a substantially flat upper surface 28 and a convexly curved bottom surface 29 that merges with an upright vane end portion 30. The surface 28 is canted at an angle a with respect to a plane P, as shown in FIG. 5, that is normal to the axis of rotation of the rotor about which the downrod 16 coaxially extends. As the rotor rotates the surfaces 28 direct air upwardly into the rotor and through the stator windings. In addition, the bottom surface 29 of the vanes is also canted upward from leading edge to trailing edge. It however is not flat but convex to provide an airfoil over which air is accelerated, it being longer from leading edge to trailing edge than the upper surface 28. Some of this accelerated air impacts the upper surface of the next successive vane thus achieving a cumulative enhancement of air intake to the stator. Thus, with this structure, orientation and arrangement of the vanes air intake flow is greatly enhanced to and through the stator and its electrical windings. A large number of peripheral fins is no longer needed. Nor is an internal impeller required. The openness of the air flow channels both into and out of the motor reduces obstruction to air flow and its attendant cost of manufacture. Air turbulence and its creation of negative eddies is also minimized.

It thus is seen that a ceiling fan motor is now provided that has enhanced air cooling for enhanced operational efficiency. Although it has been shown and described in the preferred form it should be understood that many modifications may be made thereto without departure from the spirit and scope of the invention as shown in the following claims.

The invention claimed is:

1. An inside-out ceiling fan motor having a stator mounted to a downrod with an annular array of stator coils positioned about a rotor axis of rotation, and a rotor rotatably mounted about said stator and an axis of rotor rotation, and wherein said rotor has a plurality of vanes spaced along the rotor periphery and canted at an angle of attack to a place of rotor vanes rotation oriented normally to said axis of rotor rotation to scoop ambient air into the rotor during fan operation towards and through the stator coils to cool them, and wherein each of said rotor vanes has an inside surface and an outside surface, extending between leading and trailing vane edges, and where said vane outside surfaces are longer than said vane inside surfaces as measured between said leading and trailing vane edges whereby air is accelerated over the outside vane surfaces during rotor rotation and onto the stator coils for enhanced coils cooling.

2. An inside-out ceiling fan motor comprising a stator having an annular array of electrical coils about a rotor axis of rotation, a rotor rotatably mounted about said stator and said axis of rotation, and wherein said rotor has a stack of laminated rings mounted to a rotor casing radially about said stator coils, and wherein said rotor casing has an upper portion mounted to and above said stack and a lower portion mounted to and below said stack, and wherein one of said rotor casing portion is formed with a plurality of air inlets that are at least partially bounded by a plurality of casing vanes having an inside surface proximal said stator coils and an outside surface distal said stator coils, wherein said vanes inside surfaces are oriented at an angle of attack to scoop air into the rotor during rotor rotation and through the stator coils to cool them, wherein said rotor has at least one air outlet in the other casing portion, and wherein the other of said casing portions comprises a disc mounted over said rotor stack by a plurality of mounting posts to provide a plurality of air outlets between adjacent posts.

3. An inside-out ceiling fan motor comprising a stator having an annular array of electrical coils about a rotor axis of rotation, a rotor rotatably mounted about said stator and said axis of rotation, and wherein said rotor has a stack of laminated rings mounted to a rotor casing radially about said stator coils, and wherein said rotor casing has an upper portion mounted to and above said stack and a lower portion mounted to and below said stack, and wherein one of said rotor casing portion is formed with a plurality of air inlets that are at least partially bounded by a plurality of casing vanes having an inside surface proximal said stator coils and an outside surface distal said stator coils, and wherein said vanes inside surfaces are oriented at an angle of attack to scoop air into the rotor during rotor rotation and through the stator coils to cool them, wherein said vanes outside surface are longer as measured between leading and trailing edges of said vanes than said inside vanes surfaces whereby air flow is accelerated thereover.

4. The ceiling fan of claim 3 wherein said vanes outside faces are convexly curved airfoils.

\* \* \* \* \*